United States Patent
Nagara et al.

(10) Patent No.: US 6,407,976 B2
(45) Date of Patent: *Jun. 18, 2002

(54) METHOD FOR CONTROLLING LASER LIGHT POWER, METHOD FOR DATA RECORDING INTO OPTICAL DISC, AND OPTICAL DISC RECORDING APPARATUS

(75) Inventors: Toru Nagara, Tokyo; Akio Terada, Kanagawa; Kimihiro Saito, Saitama, all of (JP)

(73) Assignee: Sony Coproration, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,170

(22) Filed: Apr. 3, 1998

(30) Foreign Application Priority Data

Apr. 11, 1997 (JP) ............................................. 9-094208

(51) Int. Cl.[7] ................................................ G11B 7/00
(52) U.S. Cl. ..................................... 369/116; 369/47.5
(58) Field of Search ............................ 369/116, 59, 58, 369/54

(56) References Cited

U.S. PATENT DOCUMENTS

| | | | | |
|---|---|---|---|---|
| 5,161,144 A | * | 11/1992 | Takeuchi et al. | 369/116 |
| 5,283,775 A | | 2/1994 | Finkelstein et al. | |
| 5,327,411 A | * | 7/1994 | Iwasa et al. | 369/59 |
| 5,381,396 A | * | 1/1995 | Tanaka et al. | 369/59 |
| 5,436,880 A | | 7/1995 | Eastman et al. | |
| 5,617,400 A | * | 4/1997 | Fuji | 369/116 |
| 5,627,813 A | * | 5/1997 | Miyashita | 369/116 |
| 5,675,568 A | | 10/1997 | Hajjar et al. | |
| 5,712,839 A | * | 1/1998 | Aoki | 369/116 |

(List continued on next page.)

FOREIGN PATENT DOCUMENTS

| | | | | |
|---|---|---|---|---|
| EP | 0 556 446 | | 8/1993 | |
| JP | 59-22241 | * | 2/1984 | 369/116 |
| JP | 2-7231 | * | 1/1990 | 369/116 |
| JP | 7-307033 | * | 11/1995 | 369/116 |

OTHER PUBLICATIONS

Motoyasu Terao: Patent Abstracts of Japan—"Information Recording Method", JP 02–7231, Jan. 11, 1990.

*Primary Examiner*—Nabil Hindi
(74) *Attorney, Agent, or Firm*—Frommer Lawrence & Haug LLP; William S. Frommer; Glenn F. Savit (57) ABSTRACT

A laser light power controlling method is provided which comprises the steps of irradiating onto an optical disc a laser light generated by a laser source driven under a data write signal; detecting a reflected portion of the laser light irradiated onto the optical disc; and detecting an undershoot of a detection signal of the reflected laser light and controlling the power of the laser light in accordance with the amount of the detected undershoot. Also, a method for writing data into an optical disc is provided which comprises the steps of irradiating onto an optical disc a laser light generated by a laser source driven under a data write signal; detecting a reflected portion of the laser light irradiated onto the optical disc; and detecting an undershoot of a detection signal of the reflected laser light and discriminating the level of the undershoot with reference to a predetermined threshold. Further, an optical disc recording apparatus is provided which comprises means of irradiating a laser light onto an optical disc correspondingly to a data write signal; a photodetector to detect a reflected portion of the laser light irradiated onto the optical disc; and an undershoot detector to detect an undershoot of a detection signal of the laser light detected by the photodetector; the power of the laser light being controlled in accordance with the amount of the detected undershoot. The optical disc may be a phase-change based one.

15 Claims, 9 Drawing Sheets

U.S. PATENT DOCUMENTS

| | | | | |
|---|---|---|---|---|
| 5,726,954 A | * | 3/1998 | Matsumoto et al. | 369/116 |
| 5,726,965 A | * | 3/1998 | Hajjar et al. | 369/116 |
| 5,732,062 A | * | 3/1998 | Yokoi et al. | 369/59 |
| 5,761,179 A | * | 6/1998 | Iwasaki et al. | 369/116 |
| 5,771,216 A | * | 6/1998 | Tatsuzawa et al. | 369/116 |
| 5,784,348 A | * | 7/1998 | Eastman et al. | 369/116 |
| 5,793,737 A | * | 8/1998 | Den Boef | 369/116 |
| 5,825,742 A | * | 10/1998 | Tanaka et al. | 369/116 |
| 5,848,043 A | * | 12/1998 | Takada et al. | 369/116 |
| 5,936,924 A | * | 8/1999 | Tanaka | 369/116 |
| 5,974,021 A | * | 10/1999 | Yoda et al. | 369/116 |
| 5,982,714 A | * | 11/1999 | Koda | 369/116 |
| 5,991,251 A | * | 11/1999 | Sakurai et al. | 369/116 |

* cited by examiner

METHOD FOR CONTROLLING LASER LIGHT POWER, METHOD FOR DATA RECORDING INTO OPTICAL DISC, AND OPTICAL DISC RECORDING APPARATUS

BACKGROUND OF THE INVENTION

1. Field of the Invention

The present invention relates to a method for controlling a laser light power used in writing data into an optical disc, a method for verifying data written in an optical disc, an optical disc recording apparatus for writing data while controlling a laser light power, and an optical disc recording apparatus capable of verifying data written in an optical disc.

2. Description of Related Art

A phase-change based optical disc has been proposed into and/or from which data is written by irradiating a laser light onto the optical disc.

The phase-change optical disc comprises a transparent substrate made of a plastic material such as polycarbonate and having a main side thereof covered with a multiple layer made of a plurality of functional layers including a phase-change material layer.

Data write and/or read is done onto and/or from the multiple layer as a recording surface by making use of the difference in reflectivity between crystalline and amorphous phases of the phase-change material in the phase-change layer.

More particularly, data is written as a pattern consisting of spaces formed in the crystalline phase of the phase-change material and marks formed in the amorphous phase, both along a track on the recording surface when irradiated with a laser light having a controlled power.

For writing such marks, a laser light is irradiated onto the recording surface to heat a region, within a focused spot of the laser light, of the phase-change material layer to a temperature above its melting point. The phase-change material layer region is changed to an amorphous phase by quenching.

Also, for writing spaces, a laser light is irradiated onto the recording surface to heat a region, within a focused spot of the laser light, of the phase-change material layer to a temperature above its crystallizing point and below its melting point, to thereby crystallize the phase-change material layer region within the focused laser spot.

Also, for data reading, a laser light is irradiated onto the recording surface to detect a difference in return amount between the reflected portions of a laser light from the spaces and marks thus written in order to read data from the optical disc.

Unlike the magneto-optic disc, the phase-change optical disc needs no application of any external magnetic field for data write and/or read. Namely, it needs no magnetic head or the like for data write and/or read. The phase-change optical disc has been researched and developed as a data recording media of a next generation.

For forming spaces and marks on the recording surface of a phase-change optical disc, it is necessary to irradiate onto the recording surface a laser light having a power corresponding to each of the spaces and marks, respectively.

Conventionally, a laser light of a preset power is used. For this reason, the system margin for a phase change of the phase-change material and the like in a phase-change optical disc is small.

Also, a so-called verification is effected of data written with spaces and marks on the recording surface of a phase-change optical disc as the case may be.

Conventionally, the above verification is effected as a separate step after writing a series of data. Therefore, the verification takes a certain time, and there has been no way to complete the verification in a shorter time, which has been one of the causes of the low data transfer rate in the phase-change recording technology.

SUMMARY OF THE INVENTION

Accordingly, the present invention has an object to overcome the above-mentioned drawbacks of the prior art by providing laser light power controlling method for optimizing a laser light power while writing data into a phase-change optical disc, and an optical disc verifying method for verifying data written in a phase-change optical disc while writing further data into the optical disc.

Also, the present invention has another object to provide an optical disc recording apparatus adapted to optimize a laser light power while writing data, and an optical disc recording apparatus adapted to verify data written in a phase-change optical disc while writing further data into the optical disc.

The above object can be accomplished by providing a laser light power controlling method, comprising, according to the present invention, the steps of irradiating onto an optical disc a laser light generated by a laser source driven under a data write signal; detecting a reflected portion of a laser light irradiated onto the optical disc; and detecting an undershoot of a detection signal of the reflected laser light and controlling the power of the laser light correspondingly to the amount of the detected undershoot.

With this laser light power controlling method, it is possible to optimize the laser light power while writing data into the optical disc. Therefore, this method can support optical discs having various characteristics. Also this method allows a large system margin.

Also, the above object can be accomplished by providing a method for writing data into an optical disc, comprising, according to the present invention, the steps of irradiating onto an optical disc a laser light generated by a laser source driven under a data write signal; detecting a reflected portion of the laser light irradiated onto the optical disc; and detecting an undershoot of a detection signal of the reflected laser light and discriminating the level of the undershoot based on a predetermined threshold.

This optical disc verifying method permits to verify data written in an optical disc while writing further data into the optical disc. Therefore, no separate step of verifying such data written in the optical disc is necessary, which dedicates to improve the data transfer rate and the like.

Further, the above object can be accomplished by providing an optical disc recording apparatus, comprising, according to the present invention, means of irradiating a laser light onto an optical disc correspondingly to a data write signal; a photodetector to detect a reflected portion of the laser light irradiated onto the optical disc; and an undershoot detector to detect an undershoot of a detection signal of the laser light detected by the photodetector; the power of the laser light being controlled based on the amount of the detected undershoot.

This optical disc recording apparatus is adapted to simultaneously optimize the laser light power while writing data into an optical disc and verify data written in the optical disc. Therefore, the optical disc recording apparatus contributes to attain a high speed of data processing.

BRIEF DESCRIPTION OF THE DRAWINGS

These objects and other objects, features, and advantages of the present invention will become more apparent from the following detailed description of one of the preferred embodiments of the present invention when taken in conjunction with the accompanying drawings, of which.

DETAILED DESCRIPTION OF THE PREFERRED EMBODIMENTS

Figure 1A:
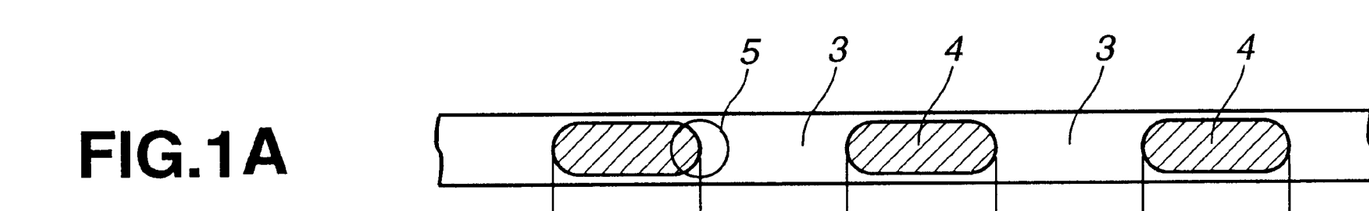
FIGS. 1A to 1C form together a timing chart showing a relationship between a power of laser light irradiated onto an optical disc and a reflected light laser from the optical disc.
Figures 1B, 1C:
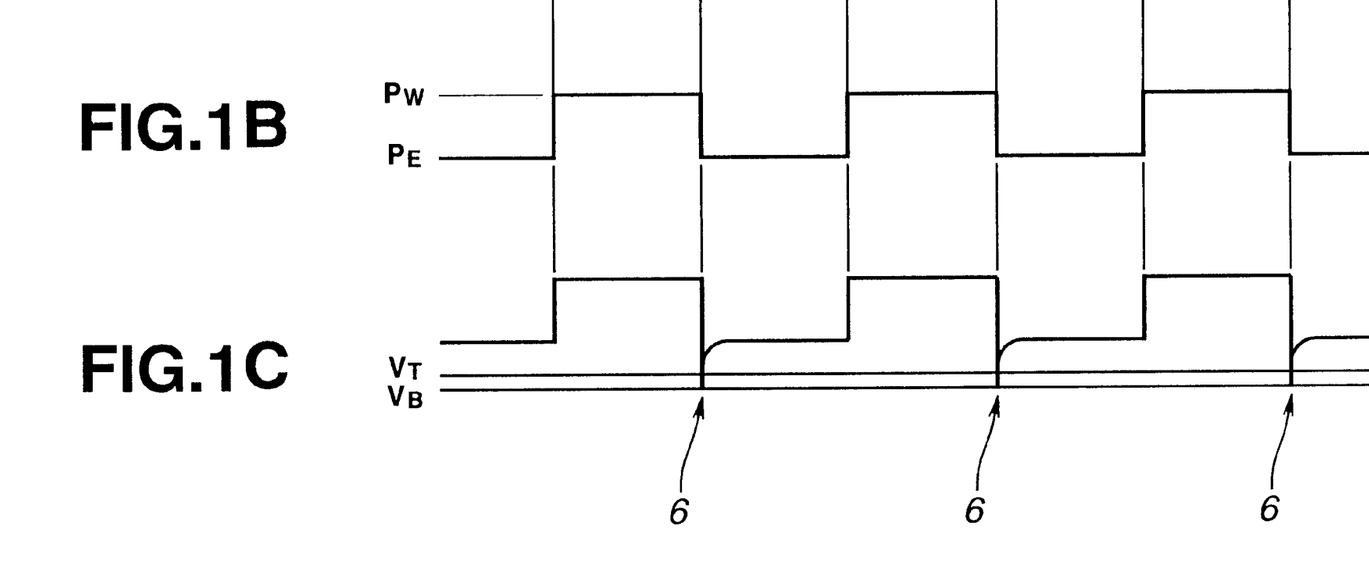

FIGS. 1A to 1B form together a timing chart showing a relationship among data written along a track on a recording surface of a phase-change optical disc with a pattern of spaces 3 and marks 4, a data write signal which drives a laser source to generate a laser light which is irradiated onto the recording surface of the phase-change optical disc to write the data there, and a return amount of a reflected portion of the laser light from the recording surface.

FIG. 1A shows the data written with the pattern of spaces 3 and marks 4 along the rack on the recording surface of the phase-change optical disc.

As mentioned above, a region of the phase-change material layer corresponding to the space 3 is in a crystalline phase in which the reflectivity of the layer is high. On the other hand, a region of the phase-change material layer corresponding to the mark 4 is in an amorphous phase. In this phase, the region shows a low reflectivity.

A focused spot 5 of the laser light is shown on the track on the recording surface. The space 3 and mark 4 are written onto the recording surface by switching the laser light focused into the spot 5 on the recording surface from one power to another.

FIG. 1B shows a typical waveform of a data write signal which drives a laser source to generate a laser light irradiated onto the recording surface to write the space 3 and mark 4 there.

When writing a space 3 onto the recording surface, a laser light having an erasing power $P_E$ is irradiated which heats a region, within the irradiated laser spot 5, of the phase-change material layer up to a temperature higher than the crystallizing point of the phase-change material and lower than the melting point. The phase-change material layer within the focused laser spot reacts with the heating with the laser light of the erasing power $P_E$ to change to a crystalline phase in which the phase-change material shows a high reflectivity. Thus the space 3 is formed.

When writing the mark 4, a laser light of a writing power $P_W$ is focused to the spot 5 on the recording surface. The laser light heats a region, within the focused laser spot 5, of the phase-change material layer up to a temperature higher than the melting point of the phase-change material which will thus be melted. As the region leaves the focused laser spot 5, the material in that region is quenched and changed to an amorphous phase in which the phase-change material shows a low reflectivity. The mark 4 is thus formed.

It should be noted that the writing power $P_W$ is higher than the erasing power $P_E$ because it heats a region, within the focused laser spot 5, of the phase-change material up to a temperature higher than the crystallizing point of the material.

FIG. 1C shows a waveform of the return amount of the reflected laser light from the phase-change optical disc.

For the space 3 shown in FIG. 1A, the return amount is proportional to an amount of the laser light having the erasing power $P_E$ multiplied by a reflectivity of the material in the crystalline phase. For the mark 4, the return amount is proportional to the amount of the laser light having the writing power $P_W$ multiplied by the reflectivity of the material in the melted phase. Both the return amounts are ones when the phase-change material is in a transitional condition. As seen from Figures, the return amount for the mark 4 is larger than that for the space 3.

Also, it is seen that when the power of the laser light irradiated onto the recording surface of the phase-change optical disc falls from the writing power $P_W$ down to the erasing power $P_E$, the return amount of the reflected laser light from the optical disc shows an undershoot 6.

As shown in FIG. 1A, the undershoot 6 will take place because the focused spot 5 of the laser light of the erasing power $P_E$ momentarily overlaps the low-reflectivity mark 4 having just been written. The undershoot 6 will be largest at the above-mentioned fall of the laser light power and disappear soon as the mark 4 leaves the focused laser spot 5.

A status of the mark 4 formed by irradiation of the laser light of the writing power $P_W$ can be known from the undershoot 6. More particularly, when a sufficient amorphous phase has been reached in the mark 4, the mark 4 will show a low reflectivity and the undershoot 6 is large. On the contrary, when the amorphous phase of the mark 4 is insufficient, the reflectivity of the mark 4 is high and the undershoot 6 is small, in comparison with the above-mentioned cases, respectively.

Based on this fact, a so-called APC (automatic power control) can be done of the laser light power correspondingly to the amount of the undershoot 6.

For instance, a minimum value $V_B$ of the undershoot 6 corresponding to the amorphous-phase degree of the mark 4 is detected to control the writing power $P_W$ of the laser light until the minimum value $V_B$ reaches a predetermined value. Then, the mark 4 of a predetermined reflectivity is formed on the recording surface.

With this method, the laser light power control can be effected following a change of the undershoot 6 on the real-time basis, so that a large system margin is available.

Also, when the amount of the undershoot 6 exceeds a threshold VT in the negative-going direction, the mark 4 can be verified by considering the amorphous-phase degree to be sufficient.

Since this verification can be done while data is being written into the optical disc, it is more advantageous in the respect of time saving than the conventional method of verification which is to be done separately from the data writing. Therefore, the verifying method of the present invention can greatly contribute to an improvement of the data transfer rate, etc.

FIGS. 2A to 2G show together a timing chart showing waveforms of various signals to be written over data written along a track of the phase-change optical disc.

Figure 2A:
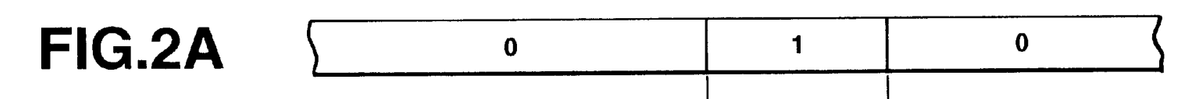
FIGS. 2A to 2G form together a timing chart showing waveforms of data when written over data already written on a track.

FIG. 2A shows a pattern of data written with spaces 3 and marks 4 along a track of the phase-change optical disc. In Figure, "0" corresponds to the space 3 while "1" corresponds to the mark 4.

Figure 2B:
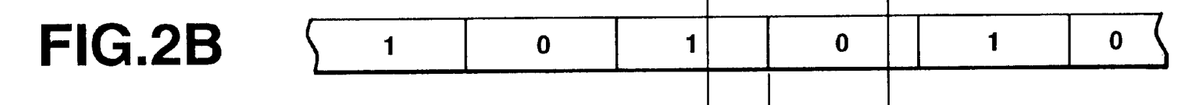

FIG. 2B shows data to be written into the phase-change optical disc. As in the above, "0" corresponds to the space 3 while "1" corresponds to the mark 4.

Figure 2C:
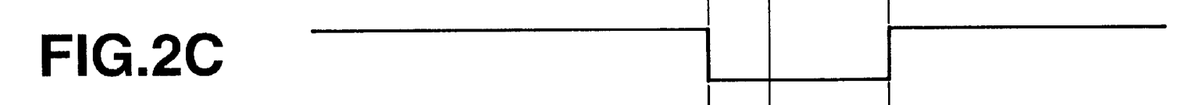

FIG. 2C shows a reflectivity of the track on the phase-change optical disc in which the data shown in FIG. 2A is written. The space 3 indicated with "0" is in a crystalline phase and thus shows a high reflectivity, while the mark 4 indicated with "1" is in an amorphous phase and therefore its reflectivity is low.

Figure 2D:
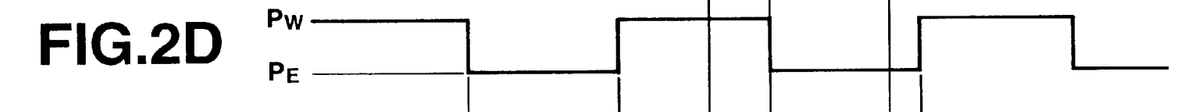

FIG. 2D shows a data write signal or pulse which drives a laser source which generates a laser light used to write the data shown in FIG. 2B. The space 3 indicated with "0" in FIG. 2B corresponds to the erasing power $P_E$ while the mark 4 indicated with "1" corresponds to the writing power $P_W$.

Figure 2E:
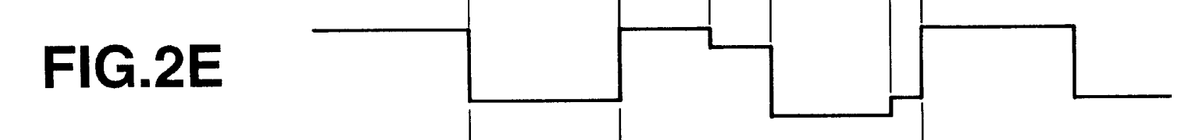

FIG. 2E shows an imaginary return amount of the reflected laser light which would be measured when no recording is successfully completed even with irradiation of a laser light of which the power is controlled under the data write pulse shown in FIG. 2D. The return amount depends upon a laser light power controlled with the data write signal shown in FIG. 2D. However, since the reflectivity of the mark 4 indicated with "1" in FIG. 2A is low, the return amount of the reflected laser light is less than that from the space 3 indicated with "0".

Figure 2F:
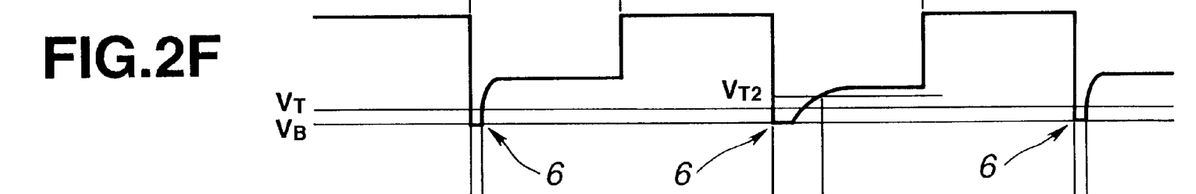

FIG. 2F shows a return amount of the reflected portion of a laser light irradiated onto the phase-change optical disc to write data with the spaces 3 and marks 4 and of which the power is controlled under the data write signal shown in FIG. 2D. As shown in FIG. 2D, the undershoot 6 takes place when the power of the data write pulse falls from the writing power $P_W$ down to the erasing power $P_E$.

As discussed above, the APC (automatic power control) can be applied to the laser light by detecting an amount of the undershoot 6, for example, a minimum value $V_B$.

Also, a written data can be verified by discriminating the level of the undershoot 6 to see if it exceeds a predetermined threshold $V_T$. Namely, when the level of the undershoot 6 exceeds the predetermined threshold $V_T$ in the negative-going direction, it can be considered that a sufficient amorphous phase has been attained in the mark 4.

Further, by judging whether the return amount of the reflected laser light exceeds a suitably set threshold $V_{T2}$ in the positive-going direction, it can be verified whether a previously written mark 4 is erased and a space 3 is formed instead. That is, when the return amount exceeds the threshold $V_{T2}$ in the positive-going direction, it can be considered that a sufficient amorphous phase has been attained in the space 3.

It should be noted that the width of the undershoot 6 varies depending upon whether data previously written in the phase-change optical disc has been written with spaces 3 or marks 4.

More particularly, when writing a space 3 into a region where a space 3 is already written, no change will take place in reflectivity, so that the width of the undershoot 6 depends upon a time taken after leaving of the focused laser spot 5 leaves the previously written space 3 until a mark 4 having been written just before the space 3 in consideration is written goes out of the focused laser spot 5.

On the contrary, when writing a space 3 into a region where a mark 4 is already written, a predetermined time is required for the phase-change material layer to react with the heating with a laser light of the erasing power $P_E$ and to change its phase from amorphous to crystalline. Thus, the undershoot 6 will have a width determined correspondingly to a reaction time for which the phase-change material layer is changed in phase from amorphous to crystalline.

As will be understood from the above, the width of the undershoot 6 in writing a space 3 into a region where a mark 4 is already written, will be larger than that in writing the space 3 into a region in which a space is already written.

Also, by judging, based on a reaction time for phase change of the phase-change material layer, whether the amount of the undershoot 6 has traversed the threshold $V_{T2}$, it is possible to verify whether a space 3 has been positively formed.

Figure 2G:
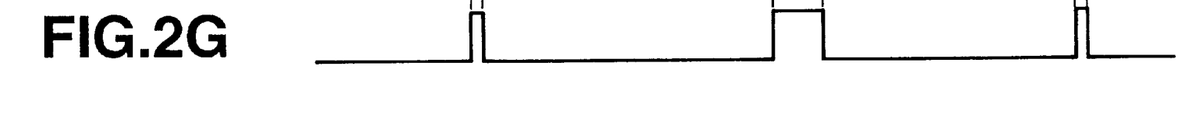

FIG. 2G shows the undershoot 6 of the return amount of the reflected laser light shown in FIG. 2F, represented by binary signals in which "1" corresponds to a time when the undershoot 6 exceeds the threshold $V_T$ in the negative-going direction "0" corresponds to other time. If the binary signals are all "1", it means that a mark 4 is written in the optical disc.

It should be noted that for the verification of the status of the phase-change material, a physical verification is also available in which occurrence of a "1" pulse is detected. Also, the verification may be effected through comparison of a timing of occurrence of the "1" pulse with the data write signal.

Figure 3:
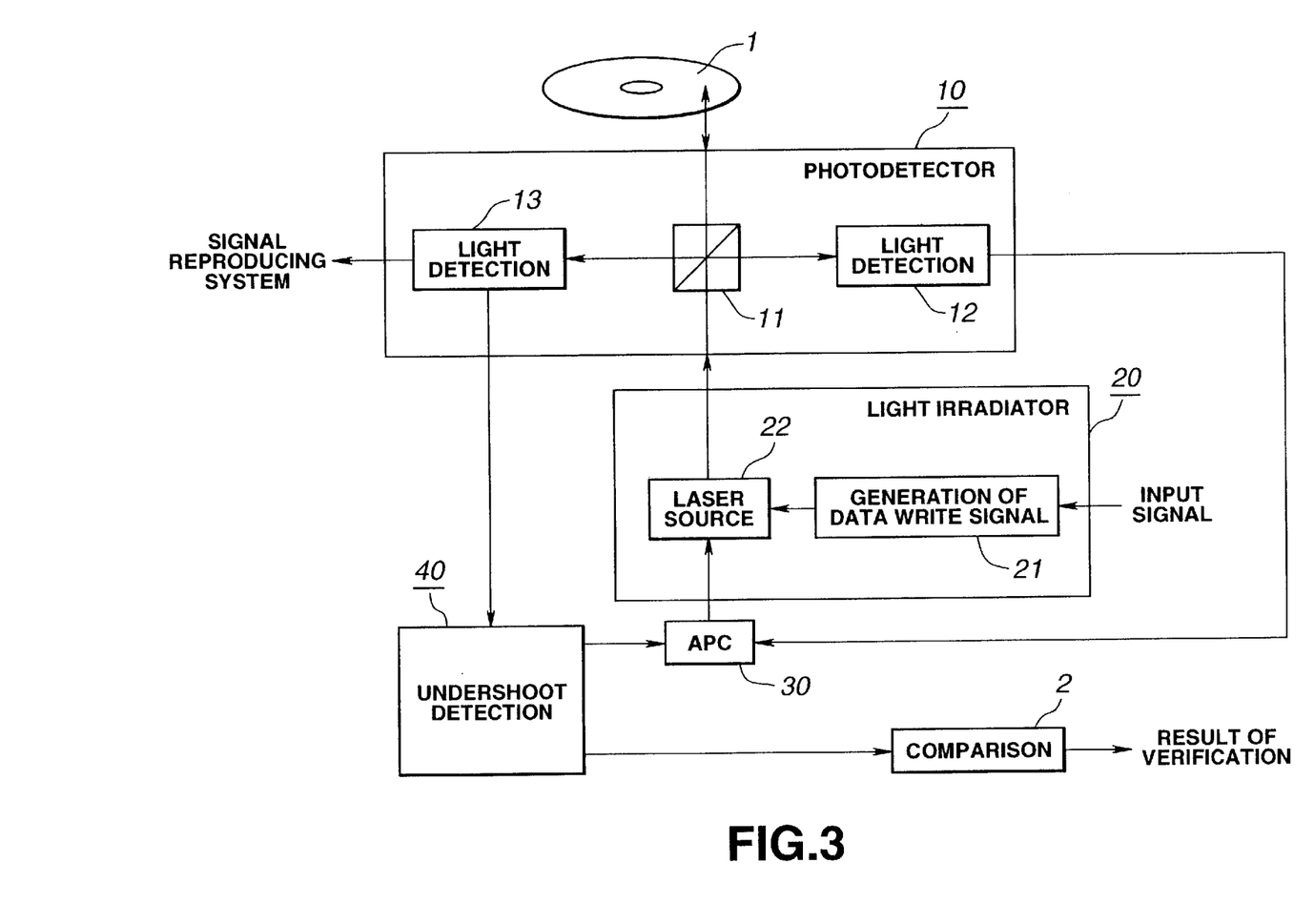
FIG. 3 is a schematic block diagram of one embodiment of the optical disc recording apparatus according to the present invention.

FIG. 3 is a schematic block diagram of one of the preferred embodiments of the optical disc recording apparatus according to the present invention.

As shown, the optical disc recording apparatus according to the present invention consists of major components including a photodetector 10, a light irradiator 20, an APC (automatic power controller) 30, an undershoot detector 40, and a comparison circuit 2. The reference numeral 1 indicates a phase-change optical disc set in this apparatus.

The photodetector 10 comprises a beam splitter 11, and first and second light detection elements 12 and 13.

The beam splitter 11 reflects a part of a laser light supplied from the light irradiator 20 toward the first light detection element 12 while allowing the remainder of the laser light to pass through it. The laser light having passed through the beam splitter 11 is irradiated onto the phase-change optical disc 1, and a reflected portion of the laser light from the optical disc 1 is reflected at the beam splitter 11 toward the second light detection element 13.

The first light detection element 12 converts the amount of the incoming laser to a current which will be supplied to the APC 30. The second light detection element 13 converts the amount of the incoming laser light to a current which will be supplied to the undershoot detector 40 and a signal reproducing system.

The light irradiator 20 consists of a data write signal generator 21 to generate a data write signal from an input signal, and a laser source 22 which generates a laser light and irradiates it onto the phase-change optical disc 1 through the beam splitter 11 in the photodetector 10.

The data write signal generator 21 generates a data write signal which will be supplied to the laser source 22 and the comparison circuit 2. The laser source 22 is controlled by the APC 30 to generate a laser light under a write control signal supplied from the data write signal generator 21.

The above-mentioned APC 30 is supplied with a current corresponding to an amount of the laser light detected by the first light detection element 12 in the photodetector 10 and a minimum value $V_B$ of the previously-mentioned undershoot 6 from the undershoot detector 40. Based on these signals, the APC 30 will control the power of the laser source 22 in the light irradiator 20 so that the minimum value $V_B$ is kept at a predetermined level.

The undershoot detector 40 is supplied with a current corresponding to the return amount of the reflected laser light from the second light detection element 13, and detects from the supplied current signal a minimum value $V_B$ of the undershoot 6, which will be delivered to the APC 30. Also, the undershoot detector 40 judges whether the undershoot 6 exceeds a threshold $V_T$, and supplies a result of the judgment to the comparison circuit 2.

The comparison circuit 2 is supplied with a timing of the data write signal from the data write signal generator 21 in the light irradiator 20 and the result of the judgment from the undershoot detector 40. Based on these supplied signals, the comparator 30 verifies a written data and delivers a result of the verification as an output.

Figure 4:
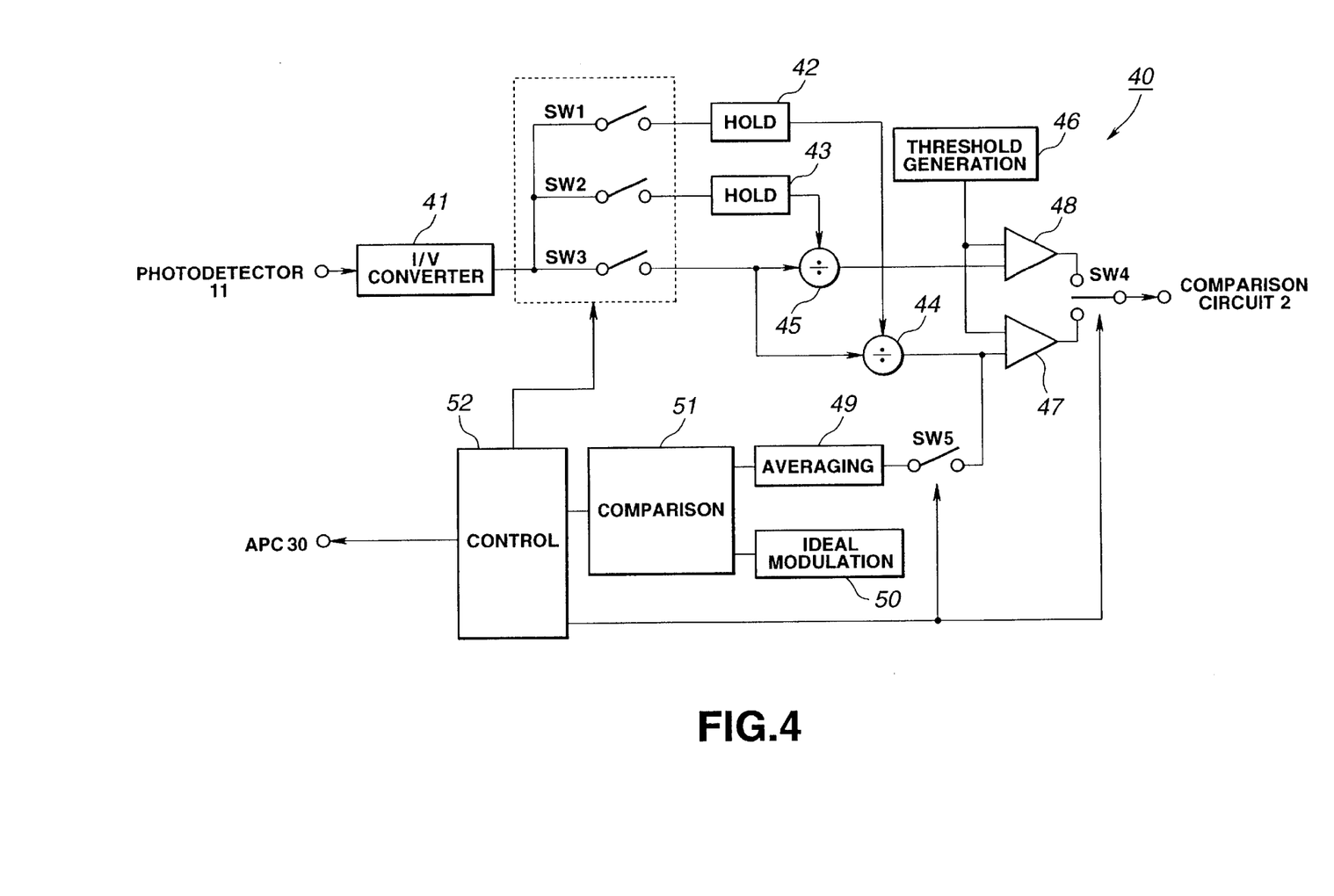
FIG. 4 is schematic block diagram of the undershoot detection circuit used in the embodiment of the optical disc recording apparatus shown in FIG. 3.

FIG. 4 shows, by way of example, the configuration of the undershoot detector 40 included as an embodiment in the present invention.

As seen, the undershoot detector 40 comprises an I/V (current/voltage) converter 41, a first hold circuit 42, a second hold circuit 43, a first divider 44, a second divider 45, a threshold generator 46, a first comparator 47, a second comparator 48, an averaging circuit 49, an ideal modulation circuit 50, a comparison circuit 51, a controller 52, and five switches SW1 to SW5.

The I/V converter 41 is supplied with a current as a return amount of the reflected laser light from the second light detection element 13, and converts the current to a voltage which will be delivered to a next stage.

The first switch SW1 opens and closes a circuit formed from the I/V converter 41 and the first hold circuit 42. The second switch opens and closes a circuit including the I/V converter 41 and the second hold circuit 43. The third switch SW3 opens and closes a circuit of the I/V converter 41, first and second dividers 44 and 45.

The first to third switches SW1 to SW3 are opened or closed based on a timing signal and the like supplied from the controller 52. In FIG. 3, the signal path is indicated with a dashed line.

While the phase-change optical disc 1 is being irradiated with a laser light having a writing power $P_W$, the switches SW1 to SW3 are all opened so that no output will be supplied from the I/V converter 41 to the circuit provided downstream of the switches.

Also, while the phase-change optical disc 1 is being irradiated with a laser light of an erasing power $P_E$, the first and second switches SW1 and SW3 are closed while the second switch SW2 is opened. Thus, an output from the I/V converter 41 is supplied to the first hold circuit 42, and to the first and second dividers 44 and 45.

Further, while the phase-change optical disc 1 is being irradiated with a laser light having a cooling power $P_C$, the first switch SW1 is opened while the second and third switches SW2 and SW3 are closed. Thus, an output from the I/V converter 41 is supplied to the second hold circuit 43, and the first and second dividers 44 and 45.

The first hold circuit 42 holds a voltage applied from the I/V converter 41 via the first switch SW1 and which corresponds to a return amount of the reflected portion of a laser light of the erasing power $P_E$ irradiated onto the phase-change optical disc 1, and will supply the first divider 44 with the voltage as a reference value for the erasing power $P_E$.

The second hold circuit 43 holds a voltage applied from the I/V converter 41 via the first switch SW2 and which corresponds to a return amount of the reflected portion of a laser light of the cooling power $P_C$ irradiated onto the phase-change optical disc 1, and will deliver the voltage to the first divider 45 as a reference value for the cooling power The first divider 44 normalizes a voltage applied from the I/V converter 41 and which corresponds to a return amount of the reflected portion of a laser light of the erasing power $P_E$ from the phase-change optical disc 1 by dividing the voltage by a reference value delivered from the first hold circuit 42.

Then the normalized voltage is applied directly to the first comparator 47 and to the averaging circuit 49 via the fifth switch SW5.

While a laser light of the cooling power is being irradiated onto the phase-change optical disc 1, the output from the first divider 44 is not selected by the fourth and fifth switches SW4 and SW5. Thus, the output will not be delivered to the circuitry located downstream of these switched SW4 and SW5.

The second divider 45 normalizes a voltage applied from the I/V converter 41 and which corresponds to a return amount of the reflected portion of a laser light of the cooling power from the phase-change optical disc 1 by dividing the voltage by a reference value delivered from the first hold circuit 42. The normalized voltage is applied directly to the second comparator 48.

It should be noted here that while the phase-change optical disc 1 is being irradiated with a laser light of the erasing power $P_E$, the output from the second divider 45 will not be delivered to the circuitry located downstream of the switch SW4 since it is not selected by the switch SW4.

The threshold generator 46 generates a threshold for delivery to the first and second comparators 47 and 48. The threshold corresponds to the threshold $V_T$ shown in FIG. 1C.

The first comparator 47 receives a voltage corresponding to a return amount of the reflected portion of a laser light having the erasing power $P_E$ and normalized by the first divider 44, and compares the voltage with a voltage of the threshold applied from the threshold generator 46. The first comparator 47 will output the result of the comparison.

While the phase-change optical disc 1 is being irradiated with a laser light of the cooling power $P_C$, the output from the first comparator 47 will not be delivered to the circuitry located downstream of the switch SW4 since it is not selected by the switch SW4.

The second comparator 48 receives a voltage corresponding to a return amount of the reflected portion of a laser light of the cooling power $P_C$ and normalized by the first divider 45, and compares the voltage with a voltage of the threshold applied from the threshold generator 46. The second comparator 48 will output the result of the comparison.

While the phase-change optical disc 1 is being irradiated with a laser light of the erasing power $P_E$, the output from the second comparator 48 will not be delivered to the circuitry located downstream of the switch SW4 since it is not selected by the switch SW4.

The fourth switch SW4 is opened or closed as timed with a signal supplied from the controller 52. More particularly, while the phase-change optical disc 1 is being irradiated with a laser light of the erasing power $P_E$, the switch SW4 selects the output from the first comparator 47. The switch SW4 selects the output from the second comparator 48 while the optical disc 1 is being irradiated with a laser light of the cooling power $P_C$. The output thus selected is delivered to the comparison circuit 2. Note that none of the outputs is selected when the laser light has the writing power $P_W$.

The fifth switch SW5 is opened or closed with a signal supplied from the controller 52. More particularly, when the phase-change optical disc 1 is irradiated with a laser light of the erasing power $P_E$, the switch SW4 is closed to pass to the averaging circuit 49 a voltage corresponding to the return amount of the reflected laser light and normalized by the first divider 44. While the laser light has the cooling power $P_C$ or while the laser light of the writing power $P_W$ is being irradiated onto the phase-change optical disc 1, the first switch SW5 is opened so that the output from the first divider 44 will not be delivered to a next stage.

When a laser light of the erasing power $P_E$ is irradiated onto the phase-change optical disc 1, the averaging circuit 49 will average the voltage corresponding to the return amount of the reflected laser light and having been normalized by the first divider 44. A result of the averaging is delivered to the comparison circuit 51.

The ideal modulation circuit 50 generates an ideal modulation signal for delivery to the comparison circuit 51 at the next stage. The comparison circuit 51 is provided to compare signals supplied from the averaging circuit 49 and the ideal modulation circuit 50, respectively, to supply the controller 52 with a result of the comparison.

Under the signal from the comparison circuit 51, the controller 52 generates and supplies to the first to fifth switches SW1 to SW5 a signal indicative of a timing of switching, from one laser power to another, of the laser light to be irradiated onto the phase-changed optical disc 1. Each of the switches SW1 to SW5 is opened or closed under the signal given thereto, respectively.

Also, under the signal supplied from the comparison circuit 51, the controller 52 generates a signal concerning the minimum value $V_B$ of the undershoot 6, which will be supplied to the APC 30.

Next, the data write signal under which the laser source is driven to generate a laser light used to write data into the phase-change optical disc 1, will be discussed in further detail.

Referring now to FIGS. 5A to 5D, the principle of each of various signals used to write data into the phase-change optical disc 1 will be described herebelow. FIGS. 5A to 5D show the waveforms of an NRZI pulse, a write pulse, a bias pulse, and an overwrite pulse, respectively.

Figures 5A, 5B:
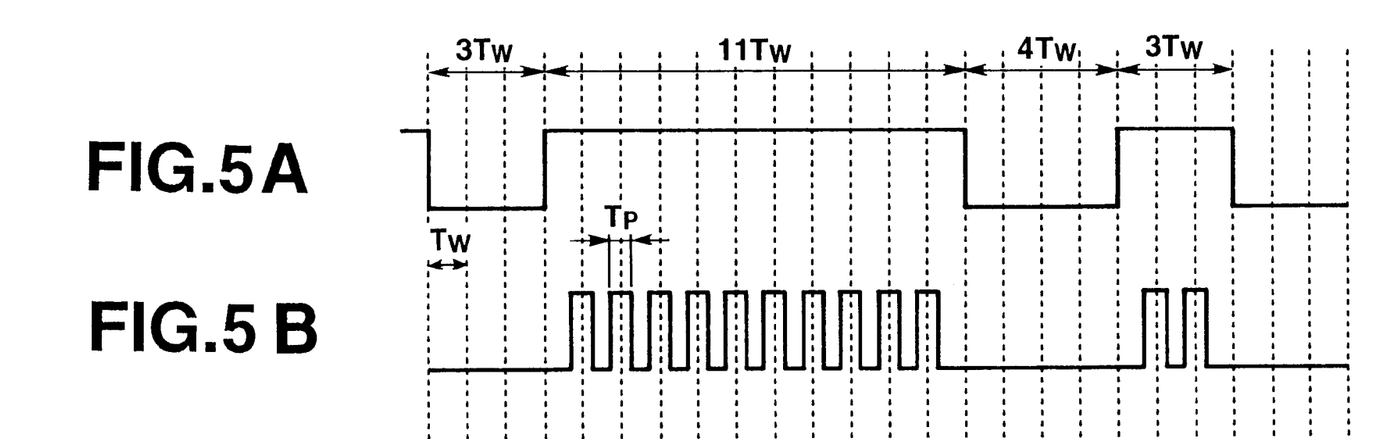
FIGS. 5A to 5D form together a timing chart showing relations between data and each of operating signals.

The NRZI (non-return to zero inverted) pulse shown in FIG. 5A is a signal derived from modulation of a digital signal. It is not changed between "0" and "1" when the digital signal has a value "0". When the digital signal value is "1", the NRZI pulse is changed to "0" or "1".

The "0" status in FIG. 5A corresponds to the space 3, while the "1" status corresponds to the mark 4. The unit period is taken as $T_W$ herein.

The NRZI pulse is already subjected to an EFM (eight to fourteen modulation) used in the digital audio technology.

As seen, a succession of "0" or "1" of the NRZI pulse is within a range of $3T_W$ to $11T_W$.

The write pulse waveform shown in FIG. 5B is used for writing the "1" status of the NRZI pulse in FIG. 5A as a mark 4 onto the recording surface of the phase-change optical disc.

As seen from FIG. 5B, a multiple pulse comprising a plurality of pulses of $T_W$ in period and $T_P$ in duration is used for writing a mark 4 corresponding to a succession of "1" over a plurality of unit periods.

For writing a succession of marks of $11T_W$ in period, for instance, ten pulses of $T_P$ in duration are used during a period $T_W$. Similarly, two pulses of $T_P$ in duration are used for writing a succession of marks of $3T_W$ in length.

Figure 5C:
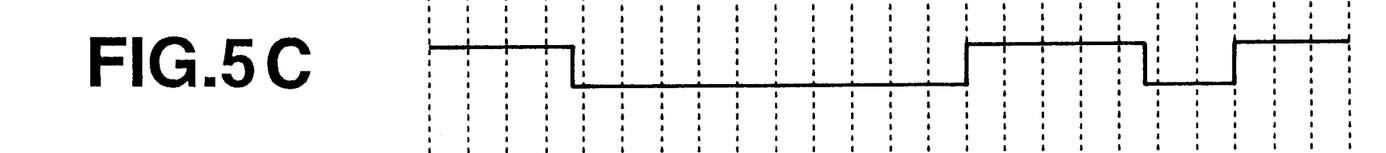

The bias pulse shown in FIG. 5C is used to erase a mark 4 in the melted amorphous phase and rewrite it to a space 4 in the crystalline phase by irradiating a laser light of the erasing power $P_E$.

The bias pulse corresponds to the erasing power $P_E$ of the laser source 22 and used to write a space 3 into the phase-change optical disc 1. The bias pulse rises when the NRZI pulse shown in FIG. 5A changes to "0". When the write pulse rises to "1", the bias pulse falls as shown in FIG. 5C.

Figure 5D:
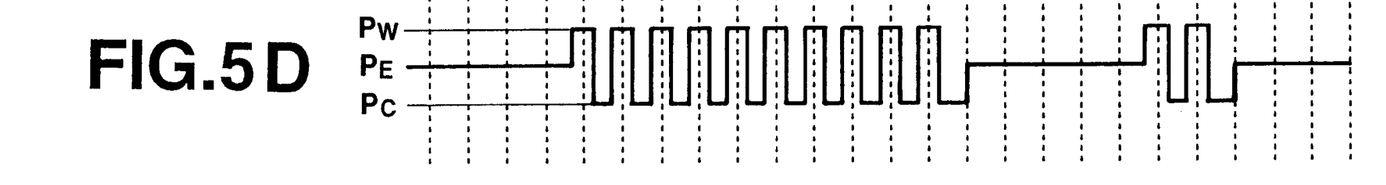

The overwrite pulse shown in FIG. 5D is a combination of a write pulse shown in FIG. 5B and a bias pulse shown in FIG. 5C. This overwrite pulse is used to write data over data already written as a pattern of spaces 3 and marks 4 on the recording surface of the phase-change optical disc 1.

More specifically, the overwrite pulse has three levels corresponding to the writing power $P_W$, erasing power $P_E$ and cooling power $P_C$. The overwrite power $P_W$ corresponds to a power of the write pulse in FIG. 5B and the bias power $P_B$ corresponds to a power of the bias pulse in FIG. 5C.

The cooling power $P_C$ corresponds to a status not being "1" of both the write pulse in FIG. 5B and bias pulse in FIG. 5C. The laser light of the cooling power $P_C$ will not heat the recording surface to a temperature for recording data.

Figure 6A:
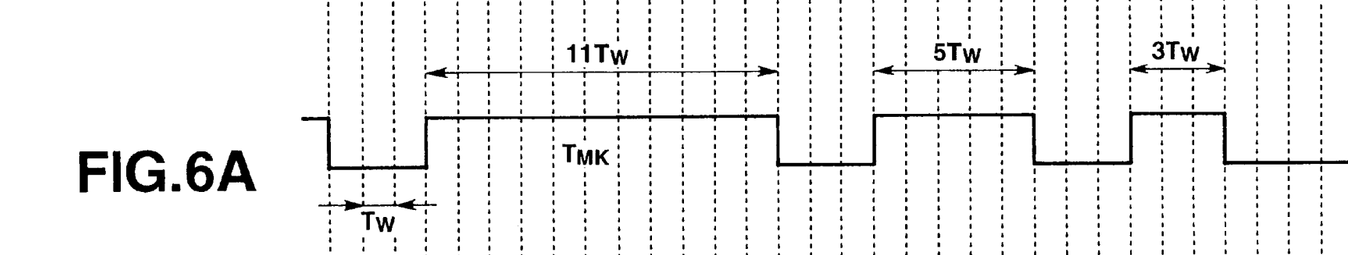
FIGS. 6A and 6B form together a timing chart showing a relation between data and an overwrite pulse.

The waveform of an actual write pulse will be described here with reference to FIG. 6. FIG. 6A shows the waveform of the above-mentioned NRZI pulse, and FIG. 6B shows the waveform of the write pulse.

As aforementioned, the NRZI pulse is already subjected to the EFM modulation. Supposing that the unit period of the pulse is $T_W$, the NRZI pulse is a succession of "0" or "1" within a range of $3T_W$ to $11T_W$ as having previously been described. The "0" status corresponds to a space 3 on the recording surface of the phase-change optical disc 1 and the "1" status corresponds to a mark 4.

Figure 6B:
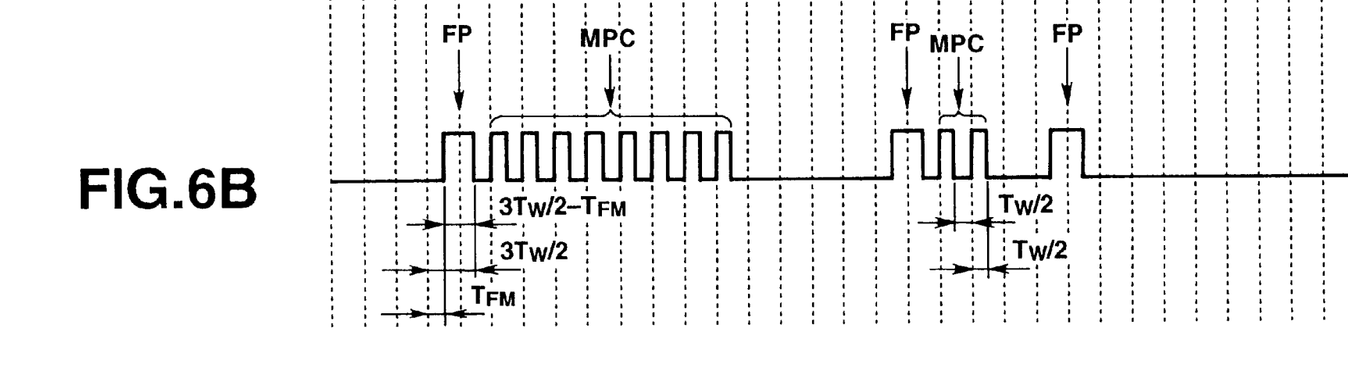

FIG. 6B shows the waveform of an actual write pulse used to write data into the phase-change optical disc 1 correspondingly to the NRZI pulses.

Unlike the multiple pulse of $T_W$ in period and $T_P$ in duration as shown in FIG. 5B, the write pulse is a multiple pulse comprising an initial pulse of $3T_W/2-T_{FM}$ in duration followed by another pulse of $T_W$ in period and $T_W/2$ in duration.

For a write pulse of $11T_W$ in duration shown in FIG. 6A, for instance, an initial pulse of $3T_W/2-T_{FM}$ indicated with FP (first pulse) in FIG. 6A is generated with a delay of $T_{FM}$ from a rise of the pulse of $11T_W$ in duration. Then, it is followed by a multiple pulse indicated with MPC (multi-pulse chain) in FIG. 6B and comprising a succession of eight pulses each having a "1" status during the former half $T_W/2$ and a duration of $T_W/2$ within a range of unit periods $2T_W$ to $10T_W$ delayed from the rise of the NRZI pulse.

Further, for a write pulse of $5T_W$ in duration shown in FIG. 6A, an initial pulse FP of $3T_W/2T_{FM}$ is generated with a delay of $T_{FM}$ from the rise of this write pulse, and followed by a multiple pulse comprising a succession of two pulses of $T_W/2$ in duration in each of which the former half of each unit period $T_W$ is a pulse within a range of $2T_W$ to $4T_W$ delayed from the rise of the duration of $5T_W$.

Also, for a write pulse of $3T_W$ in duration shown in FIG. 6A, an initial pulse FP of $3T_W/2T_{FM}$ in duration is generated with a delay of $T_{FM}$ from the rise of the pulse of $3T_W/2-T_{FM}$ in duration as in the above. In this case, the above-mentioned multiple pulse will not be generated.

Next, an actual overwrite pulse will be discussed in detail herebelow with reference to FIG. 7. The overwrite pulse corresponds directly to a data write signal under which the laser source 22 is driven to generate a laser light for writing data into the phase-change optical disc 1.

Figure 7:
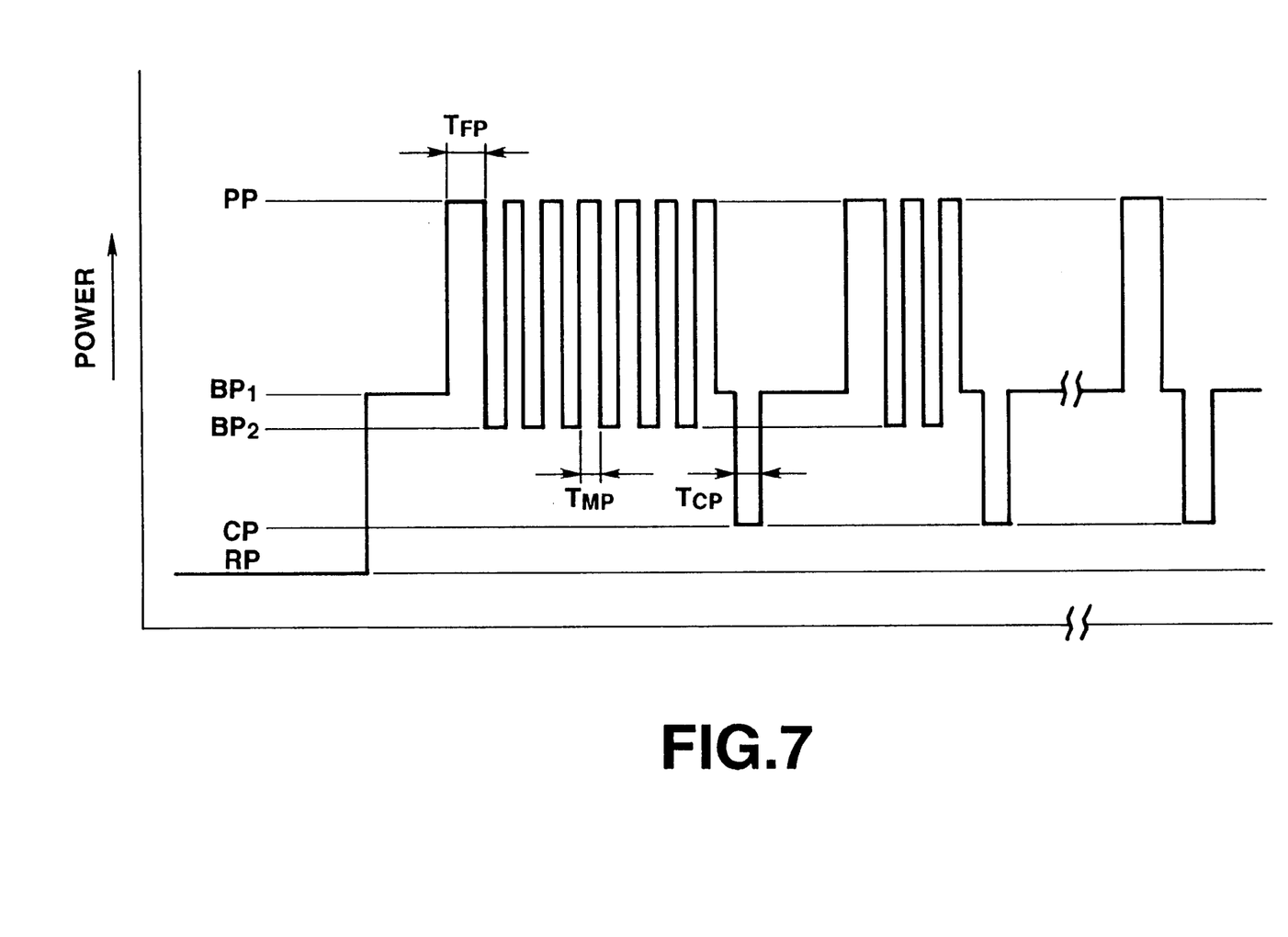
FIG. 7 is a timing chart of a data write signal

As shown in FIG. 7, the laser light powers include a peak power PP, a first bias power $BP_1$, a second bias power $BP_2$, a cooling power $P_C$, and a reading power RP arranged in the descending order of level.

In FIG. 7, the reference $T_{FP}$ indicates the duration of an initial pulse, $T_{MP}$ indicates the duration of one pulse included a multiple pulse, and $T_{CP}$ indicates the duration of a cooling pulse.

The reading power RP is used for reading data written as a pattern of the spaces 3 and marks 4 in the recording surface of a phase-change optical disc 1 by focusing a laser light onto the recording surface.

For writing a mark 4 onto the recording surface, the peak power PP is used. The first bias power BP, is used to write a space 3 onto the recording surface. However, the second bias power $BP_2$ is used between the initial pulse FP and multiple pulse MPC, and between the pulses included in the multiple pulse MPC. A cooling pulse CP of $T_{CP}$ in duration is generated in a predetermined time after completion of the multiple pulse MPC.

Figure 8A:
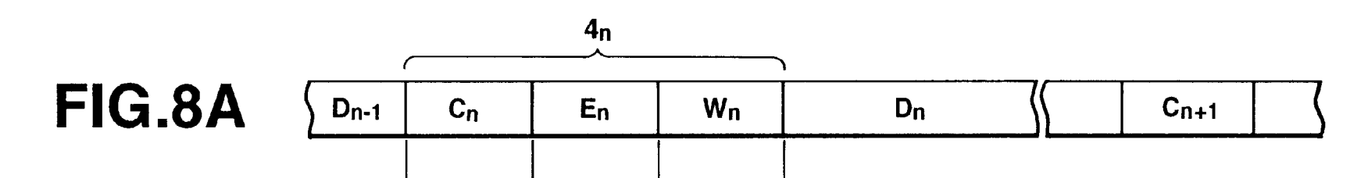
FIG. 8A shows a configuration of each sector on the recording surface, and FIGS. 8B to 8D form together a sample and hold timing chart.
Figure 8B:
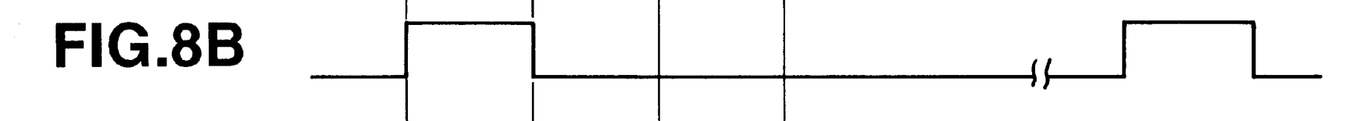
Figure 8C:
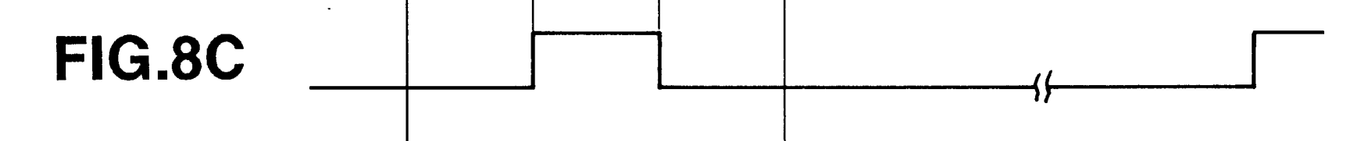
Figure 8D:
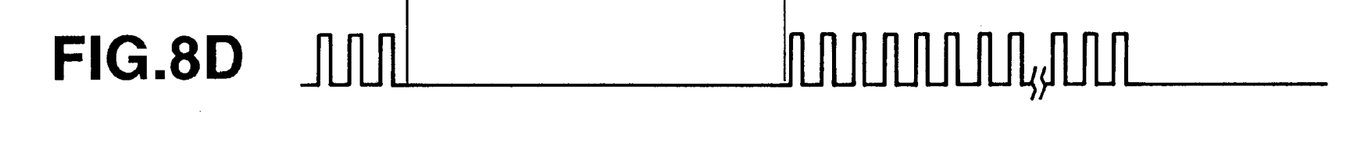

FIGS. 8A shows a configuration of each sector written on the recording surface of the phase-change optical disc 1, and FIGS. 8B to 8D form together a chart of sample and hold timing.

As shown in FIG. 8A, data written along a track on the recording surface of the phase-change optical disc 1 is composed of sectors. In FIG. 8A, an n-th sector consists of a n-th data write area Dn. The n-th APC pull-in area An further comprises an n-th cooling power pull-in area Cn, n-th erasing power pull-in area En, and an n-th writing power pull-in area Wn.

FIG. 8B shows an sample and hold signal for the erasing power pull-in area Cn. In Figure, "1" corresponds to "sample", and "0" corresponds to "hold" (which is also true for the following description). Samples are taken out at the timing when data is written into the cooling power pull-in area Cn.

FIG. 8C shows a sample and hold signal for the erasing power pull-in area En. Samples are taken out at the timing when data is written into the cooling power pull-in area En.

FIG. 8D shows a sample and hold signal for the data write area Dn. Samples are taken out at predetermined time intervals.

Figure 9:
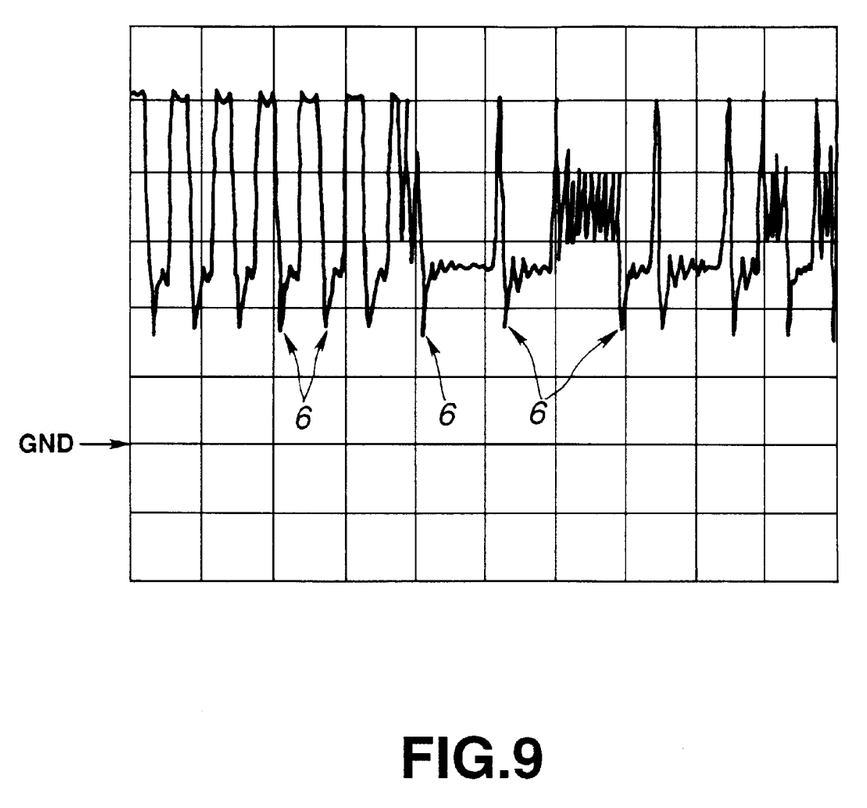
FIG. 9 graphically shows the results of a measurement of a return component, from an optical disc, of a laser beam irradiated onto the optical disc.

FIG. 9 shows the results of measurement of the return amount of the reflected laser light from the phase-change optical disc 1 when data is written into the optical disc 1 by irradiation of a laser light corresponding to the data write signal. Along the horizontal axis, one division corresponds to 500 ns while one division along the vertical axis corresponds to 500 mV.

In Figure, the waveform of the return amount of the reflected laser light shows an undershoot 6 at the fall of each pulse.

What is claimed is:

1. A laser light power controlling method, comprising the steps of:
    irradiating onto an optical disc a laser light generated by a laser source driven under a data write signal, said optical disc having a phase-change material layer;
    detecting a reflected portion of the laser light irradiated onto the optical disc; and
    detecting an undershoot of a detection signal of the reflected laser light and controlling the power of the laser light in accordance with the amount of the detected undershoot, wherein the undershoot is due to: a change in the laser light power from a first laser power to a second, lower laser power; a movement of a laser spot on the optical disc; and a change of the phase-change material layer on the optical disc;
    wherein said change of the phase-change material layer is a change from an amorphous phase region to a crystalline phase region as the laser spot is moved on the optical disc and the laser light power is reduced from the first to second laser power to cause said change of the phase-change material layer.

2. The method according to claim 1 wherein said laser light power is controlled to a level sufficient for the amplitude of the detected undershoot to be at least equal to a predetermined threshold ensuring that the reflectivity of the amorphous phase region is sufficient.

3. A laser light power controlling method, comprising the steps of:
    irradiating onto an optical disc a laser light generated by a laser source driven under a data write signal, said optical disc having a phase-change material layer;
    detecting a reflected portion of the laser light irradiated onto the optical disc; and
    detecting an undershoot of a detection signal of the reflected laser light and controlling the power of the laser light in accordance with the amount of the detected undershoot, wherein the undershoot is due to: a change in the laser light power from a first laser power to a second, lower laser power; a movement of a laser spot on the optical disc; and a change of the phase-change material layer on the optical disc;
    wherein said change of the phase-change material layer is a change from a layer having a relatively low reflectivity to a layer having a relatively high reflectivity as the laser spot is moved on the optical disc and the power is reduced from the first to second laser power to cause said change of the phase-change material layer.

4. The method according to claim 3 wherein said laser light power is controlled to a level sufficient for the amplitude of the detected undershoot to be at least equal to a predetermined threshold ensuring that the reflectivity of the low reflectivity region is sufficient.

5. A laser light power controlling method, comprising the steps of:
    irradiating onto an optical disc a laser light generated by a laser source driven under a data write signal to overwrite data already existing on said optical disc, said optical disc having a phase-change material layer;
    detecting a reflected portion of the laser light irradiated onto the optical disc;

detecting an undershoot of a detection signal of the reflected laser light and controlling the power of the laser light in accordance with the amount of the detected undershoot, wherein the undershoot is due to: a change in the laser light power from a first laser power to a second, lower laser power; a movement of a laser spot on the optical disc; and a change of the phase-change material layer on the optical disc; and verifying, when attempting to overwrite a low reflectivity mark to create a high reflectivity mark, that the detection signal rises in a period following said undershoot to a level higher than a pre-established threshold, to thereby verify that said high reflectivity mark has been sufficiently created.

6. A method for recording data onto an optical disc, comprising the steps of:

irradiating onto an optical disc a laser light generated by a laser source driven under a data write signal, said optical disc having a phase-change material layer;

detecting a reflected portion of the laser light irradiated onto the optical disc; and detecting an undershoot of a detection signal of the reflected laser light and discriminating the level of the undershoot with reference to a predetermined threshold, wherein the undershoot is due to: a change in the laser light power from a first laser power to a second, lower laser power; a movement of a laser spot on the optical disc; and a change of the phase-change material layer on the optical disc;

wherein said change of the phase-change material layer is a change from an amorphous phase region to a crystalline phase region as the laser spot is moved on the optical disc and the laser light power is reduced from the first to second laser power to cause said change of the phase-change material layer.

7. The method according to claim 6 wherein if the amplitude of the detected undershoot is at least equal to said predetermined threshold, it is determined that the reflectivity of the amorphous phase region is sufficient.

8. A method for recording data onto an optical disc, comprising the steps of:

irradiating onto said optical disc a laser light generated by a laser source driven under a data write signal, said optical disc having a phase-change material layer;

detecting a reflected portion of the laser light irradiated onto the optical disc; and detecting an undershoot of a detection signal of the reflected laser light and discriminating the level of the undershoot with reference to a predetermined threshold, wherein the undershoot is due to: a change in the laser light power from a first laser power to a second, lower laser power; a movement of a laser spot on the optical disc; and a change of the phase-change material layer on the optical disc;

wherein said change of the phase-change material layer is a change from a layer having a relatively low reflectivity to a layer having a relatively high reflectivity as the laser spot is moved on the optical disc and the power is reduced from the first to second laser power to cause said change of the phase-change material layer.

9. The method according to claim 8 wherein if the amplitude of the detected undershoot is at least equal to said predetermined threshold, it is determined that the reflectivity of the low reflectivity region is sufficient.

10. A method for recording data onto an optical disc, comprising the steps of:

irradiating onto the optical disc a laser light generated by a laser source driven under a data write signal, to overwrite data already existing on said optical disc, said optical disc having a phase-change material layer;

detecting a reflected portion of the laser light irradiated onto the optical disc;

detecting an undershoot of a detection signal of the reflected laser light and discriminating the level of the undershoot with reference to a predetermined threshold, wherein the undershoot is due to: a change in the laser light power from a first laser power to a second, lower laser power; a movement of a laser spot on the optical disc; and a change of the phase-change material layer on the optical disc; and verifying, when attempting to overwrite a low reflectivity mark to create a high reflectivity mark, that the detection signal rises in a period following said undershoot to a level higher than a second pre-established threshold, to thereby verify that said high reflectivity mark has been sufficiently overwritten over the low reflectivity mark.

11. An optical disc recording apparatus, comprising:

irradiating means for irradiating a laser light onto an optical disc correspondingly to a data write signal, said optical disc having a phase-change material layer;

a photodetector to detect a reflected portion of the laser light irradiated onto the optical disc; and an undershoot detector to detect an undershoot of a detection signal of the laser light detected by the photodetector, wherein the undershoot is due to: a change in the laser light power from a first laser power to a second, lower laser power; a movement of a laser spot on the optical disc; and a change of the phase-change material layer on the optical disc;

wherein the power of the laser light is controlled in accordance with the amount of the detected undershoot; and said change of the phase-change material layer is a change from an amorphous phase region to a crystalline phase region as the laser spot is moved on the optical disc and the laser light power is reduced from the first to second laser power to cause said change of the phase-change material layer.

12. Apparatus according to claim 11 wherein laser light power is controlled to a level sufficient for the amplitude of the detected undershoot to be at least equal to a predetermined threshold ensuring that the reflectivity of the amorphous phase region is sufficient.

13. An optical disc recording apparatus, comprising:

irradiating means for irradiating a laser light onto an optical disc correspondingly to a data write signal, said optical disc having a phase-change material layer:

a photodetector to detect a reflected portion of the laser light irradiated onto the optical disc; and an undershoot detector to detect an undershoot of a detection signal of the laser light detected by the photodetector, wherein the undershoot is due to: a change in the laser light power from a first laser power to a second, lower laser power; a movement of a laser spot on the optical disc; and a change of the phase-change material layer on the optical disc;

wherein the power of the laser light is controlled in accordance with the amount of the detected undershoot; and said change of the phase-change material layer is a change from a layer having a relatively low reflectivity to a layer having a relatively high reflectivity as the laser spot is moved on the optical disc and the power is reduced from the first to second laser power to cause said change of the phase-change material layer.

14. Apparatus according to claim 13 wherein said laser light power is controlled to a level sufficient for the amplitude of the detected undershoot to be at least equal to a predetermined threshold ensuring that the reflectivity of the low reflectivity region is sufficient.

15. An optical disc recording apparatus, comprising:

irradiating means for irradiating a laser light onto an optical disc correspondingly to a data write signal, and overwriting data already existing on said optical disc, said optical disc having a phase-change material layer;

a photodetector to detect a reflected portion of the laser light irradiated onto the optical disc;

an undershoot detector to detect an undershoot of a detection signal of the laser light detected by the photodetector, wherein the undershoot is due to: a change in the laser light power from a first laser power to a second, lower laser power; a movement of a laser spot on the optical disc; and a change of the phase-change material layer on the optical disc, wherein the power of the laser light is controlled in accordance with the amount of the detected undershoot; and verification means for verifying, when attempting to overwrite a low reflectivity mark to create a high reflectivity mark, that the detection signal rises in a period following said undershoot to a level higher than a pre-established threshold, to thereby verify that said high reflectivity mark has been sufficiently overwritten over the low reflectivity mark.

* * * * *

UNITED STATES PATENT AND TRADEMARK OFFICE
CERTIFICATE OF CORRECTION

PATENT NO. : 6,407,976 B2
DATED : June 18, 2002
INVENTOR(S) : Nagara et al.

It is certified that error appears in the above-identified patent and that said Letters Patent is hereby corrected as shown below:

<u>Title page,</u>
Item [73], should read -- [73]    Assignee:    Sony Corporation --

Signed and Sealed this

Fourteenth Day of September, 2004

JON W. DUDAS
*Director of the United States Patent and Trademark Office*